Jan. 2, 1934.    B. A. SWENNES    1,941,763
TORQUE STABILIZER SPRING
Filed Sept. 29, 1932    2 Sheets-Sheet 1
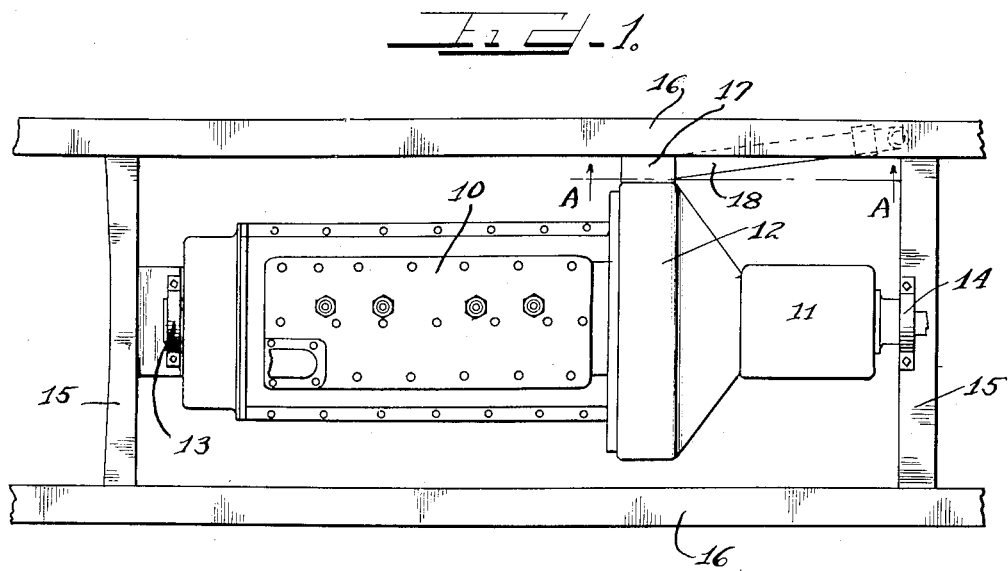
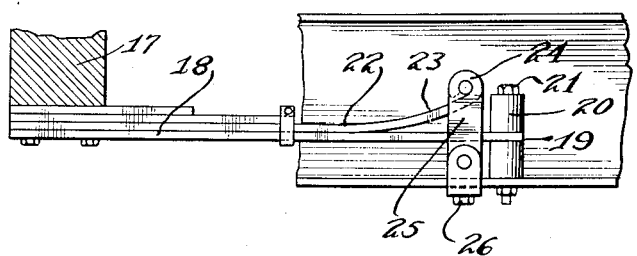
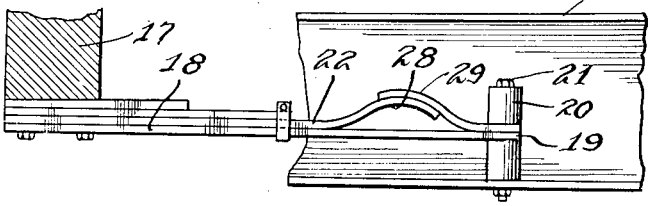
Inventor
Benjamin A. Swennes.

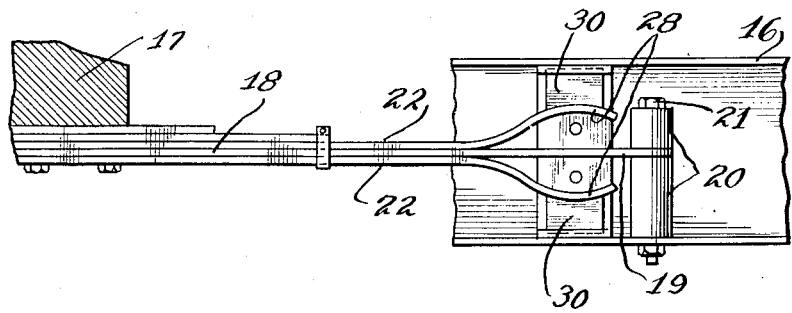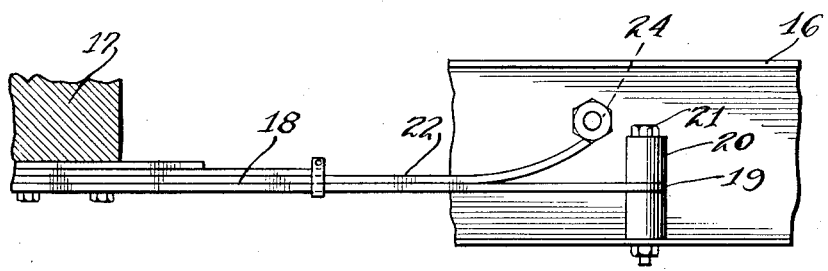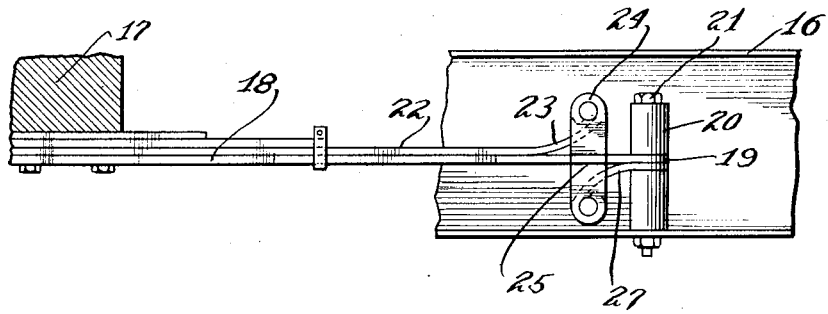

Patented Jan. 2, 1934

1,941,763

UNITED STATES PATENT OFFICE 1,941,763

TORQUE STABILIZER SPRING

Benjamin A. Swennes, Rockford, Ill., assignor to Borg-Warner Corporation, Chicago, Ill., a corporation of Illinois Application September 29, 1932
Serial No. 635,399

7 Claims. (Cl. 248—14.2)

This invention relates to engine mountings designed to isolate the vehicle frame or other foundation from engine sensation due to vibration and torque fluctuations. More particularly my invention relates to improved torque stabilizers for use with an engine mounted for pivotal movement about a longitudinal axis, the torque stabilizer being used to yieldingly absorb and oppose the rotary movements of the engine in its pivotal mounting caused by vibration and the reaction of the power impulses acting on the crankshaft of a conventional internal combustion engine.

Where the engine is pivotally mounted at two points in a plane parallel with its crankshaft, the engine is more or less free to rock about the axis so formed. The pivotal mountings need not be of restricted diameter, completely enveloping a bearing, or of rigid construction, as in any case the predominant movement permitted is a rotary or oscillatory one. It has heretofore been proposed to provide yielding resistance in proportion to such rotary movements in order to oppose such movements and restore the engine to its normal position, but the problem encountered places limitations on the permissible engine movement because of exhaust pipe, clutch control and throttle control connections, each of which are affected by excessive engine movements. If the normal engine movements are restrained to too great an extent the restraining means or the pivotal mountings are apt to transmit engine sensation to the vehicle frame. It is accordingly an important object of this invention to provide an improved resilient torque stabilizer which is adapted to permit relatively unrestrained movement of the engine within its usual or desired amplitude of oscillation while rapidly building up resistance to excessive movements which are practically limited to a predetermined maximum. I accomplish this result by utilizing a leaf spring of the desired resistance characteristics which as is well known deflects in proportion to the applied load, and add thereto spring stiffening structures which act to build up the resistance of the spring as deflection increases, in effect increasing the extreme resistance to such an extent as to limit the movement to a predetermined maximum, which is not however a solid stop capable of transmitting vibration to the frame.

It is another object of this invention to provide an improved and simplified torque stabilizing connection for so-called floating engine mountings which will stabilize the engine movements within a narrow range without adversely affecting the insulation of the chassis from the engine.

Other and further important objects of this invention will be apparent from the disclosures in the specification and the accompanying drawings.

This invention is illustrated in the drawings in several forms which will hereafter be more fully described.

On the drawings:

Figure 1 is a plan view of an engine mounting embodying a torque stabilizer corresponding to my invention.

Figure 2 is an elevation of one form of stabilizer embodying the features of this invention, the view corresponding to the section line A—A in Fig. 1.

Figure 3 is a similar view of another form of my invention.

Figure 4 is a stabilizer embodying a modification of Fig. 3 designed to check both deflection and reaction.

Figure 5 is a stabilizer embodying another modification of Figure 3.

Figure 6 is a stabilizer embodying a modification of Fig. 2.

As shown on the drawings.

Since the various forms of torque stabilizers illustrated can be interchangeably applied to the showing of Fig. 1 it will be convenient to briefly point out the features thereof, although the particular structure is not part of my invention. An internal combustion engine is indicated at 10 with a unitary type of transmission 11 attached to the flywheel housing 12 thereof. The engine unit is pivotally mounted at front and rear as indicated by the bearings 13 and 14 which are supported on cross members 15 between the chassis side rails 16 in the case of a vehicle installation. While the bearings are preferably of rubber, to provide a resilient construction permitting transverse and vertical movements, and may be located in the axis of the crankshaft, I do not desire to limit myself to such material or pivotal axis as a high mounting at the front, giving an inclined axis, has highly advantageous features.

The torque stabilizers of this invention are preferably mounted on a boss 17 attached to the flywheel housing and the resilient ends of the stabilizers are preferably anchored to the frame. It is immaterial to my invention whether the stabilizer is mounted in approximate parallelism with the engine axis or transversely disposed relative thereto. However the illustrated mounting has the advantage that it also serves as a tie rod to maintain the engine in proper longitudinal position and thus relieve the bearings 13 and 14 of shocks due to a tendency to longitudinal movement of the engine as a result of acceleration or braking forces.

Each of the torque stabilizers have in common a laminated or leaf spring 18 the free end 19 of the main leaf being anchored to the chassis side rail 16 by suitable spacers 20 and a bolt 21. The butt end of the spring 18 is in each case attached to the boss 17. The arrangement so far described would result in a deflection proportional to the torque load or shock applied, so that excessive impulses would result in corresponding engine movements that would require expensive and complicated provisions therefor in the mounting of the various parts attached to the engine. It may be noted at this point that for the normal direction of rotation of the engine the stabilizers shown will be deflected by a downward movement of the boss 17 due to torque reactions to the power impulses.

In each of the illustrated modifications an auxiliary spring leaf 22 is provided, the outer end of which is variously arranged in the several figures to increase the resistance to spring distortion as the load or deflecting force increases.

In Fig. 2 the free end 23 of the auxiliary leaf 22 is curved upwardly relative to the main leaf and terminates in an eye 24 having a shackle connection 25 to an anchor 26 applied to the side rail 16. Fig. 6 is similar to Fig. 2 except that the shackle 25 is anchored to a stub spring 27 held together with the end of the main leaf by the spacers 20 and bolt 21. In Fig. 5 the spring eye 24 is bolted directly to the side rail 16 so that this arrangement builds up greater resistance as displacement occurs.

In Fig. 3 the end 28 of the auxiliary spring leaf 22 is bent away from the main leaf and terminates in a return bend which engages beneath a similarly shaped stub spring 29 anchored by the spacers 20 and bolt 21, the arrangement being such that the end 28 is preloaded to develop frictional retardation to initial movement relative to the stub spring. This frictional resistance resists minor fluctuations and permits more freedom in response to the normal range of movements but again stiffens up when spring deflection increases to a point where the auxiliary spring leaf is effective to stiffen the main spring leaf. Fig. 4 is a development of this idea in that a rubber bumper 30 provides the frictional resistance and preloading. This figure also illustrates the use of a second similar auxiliary spring leaf on the opposite side of the main leaf to provide equivalent cushioning on action and reaction. It will be evident that the other modifications can also be similarly arranged to provide for cushioning the rebound or return movement.

In the operation of these various forms of stabilizers the initial rocking or oscillatory movement of the engine in its pivotal supports causes a deflection in the stabilizer which increases as the torque reactions or shocks increase in force. However, the auxiliary leaf serves both to dampen such deflections and to build up increasing resistance to increased deflections so that a practical limit of engine movement can be predetermined by the stabilizer design without sacrificing the well known advantages inherent in a freely mounted or floating engine.

The auxiliary spring structures of Figs. 2, 5 and 6 have their free ends 23 bent away from the main leaf 18 and shackled or bolted in spaced relationship with the main leaf anchor. Thus the auxiliary and main spring leaves form a triangle ineffective to stiffen the spring at low amplitudes of deflection, but, as the spring is further depressed or bent by increasing load, the main spring is brought more into line with the auxiliary leaf and serves to materially stiffen the whole spring, the spring deflection being in effect limited to a predetermined maximum without the sharply apparent "bottoming" effect produced by limiting the engine movement by positive steps. The other forms of the invention work in a similar way, as the rubber cushions serve the same function as the shackles of Figs. 2 and 6.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. A torque stabilizer for power plant units pivotally mounted relative to a support, comprising a yielding member connected between the power plant unit and the support, said yielding member being adapted to yieldingly permit pivotal movements of the power plant unit in proportion to the energizing force causing such movements, and means associated with said yielding member adapted to build up disproportionately increasing resistance in response to increased pivotal movements whereby to provide a predetermined limiting position for abnormal pivotal forces.

2. A torque stabilizer for power plant units pivotally mounted relative to a support, comprising a yielding member connected between the power plant unit and the support, said yielding member being adapted to yieldingly permit pivotal movements of the power plant unit in proportion to the energizing force causing such movements, and auxiliary yielding means associated with said member adapted to provide a predetermined limiting position thereof to abnormal forces.

3. A torque stabilizer for power plant units pivotally mounted relative to a support, comprising a yielding member connected between the power plant unit and the support, said yielding member being adapted to yieldingly permit pivotal movements of the power plant unit in proportion to the energizing force causing such movements, and spring means associated with said yielding member adapted to limit abnormal deflections thereof.

4. A torque stabilizer for power plant units pivotally mounted relative to a support, comprising a cantilever spring anchored at its ends to the power plant unit and the support and auxiliary spring means secured for a portion of its length to the cantilever spring and having its free end anchored to the support in spaced relationship to the cantilever spring anchorage thereon.

5. A torque stabilizer for power plant units pivotally mounted relative to a support, comprising a cantilever spring anchored at its ends to the power plant unit and the support and auxiliary spring means secured for a portion of its length to the cantilever spring and having its free end shackled to the support in spaced relationship to the cantilever spring anchorage thereon.

6. A torque stabilizer for power plant units pivotally mounted relative to a support, comprising a cantilever spring anchored at its ends to the power plant unit and the support and auxiliary spring means secured for a portion of its length to the cantilever spring and having its free end yieldingly anchored to the support in spaced relationship to the cantilever spring anchorage thereon.

7. A torque stabilizer for power plant units pivotally mounted relative to a support, comprising a cantilever spring anchored at its ends to the power plant unit and the support auxiliary spring means secured for a portion of its length to the cantilever spring and having its free end in spaced relationship to the end of the spring anchored to the support and means for yieldingly and frictionally engaging the free end of said auxiliary spring means.

BENJAMIN A. SWENNES.